No. 658,860. Patented Oct. 2, 1900.
P. P. NUNGESSER.
COVER FOR BATTERY JARS.
(Application filed Feb. 13, 1900.)
(No Model.)
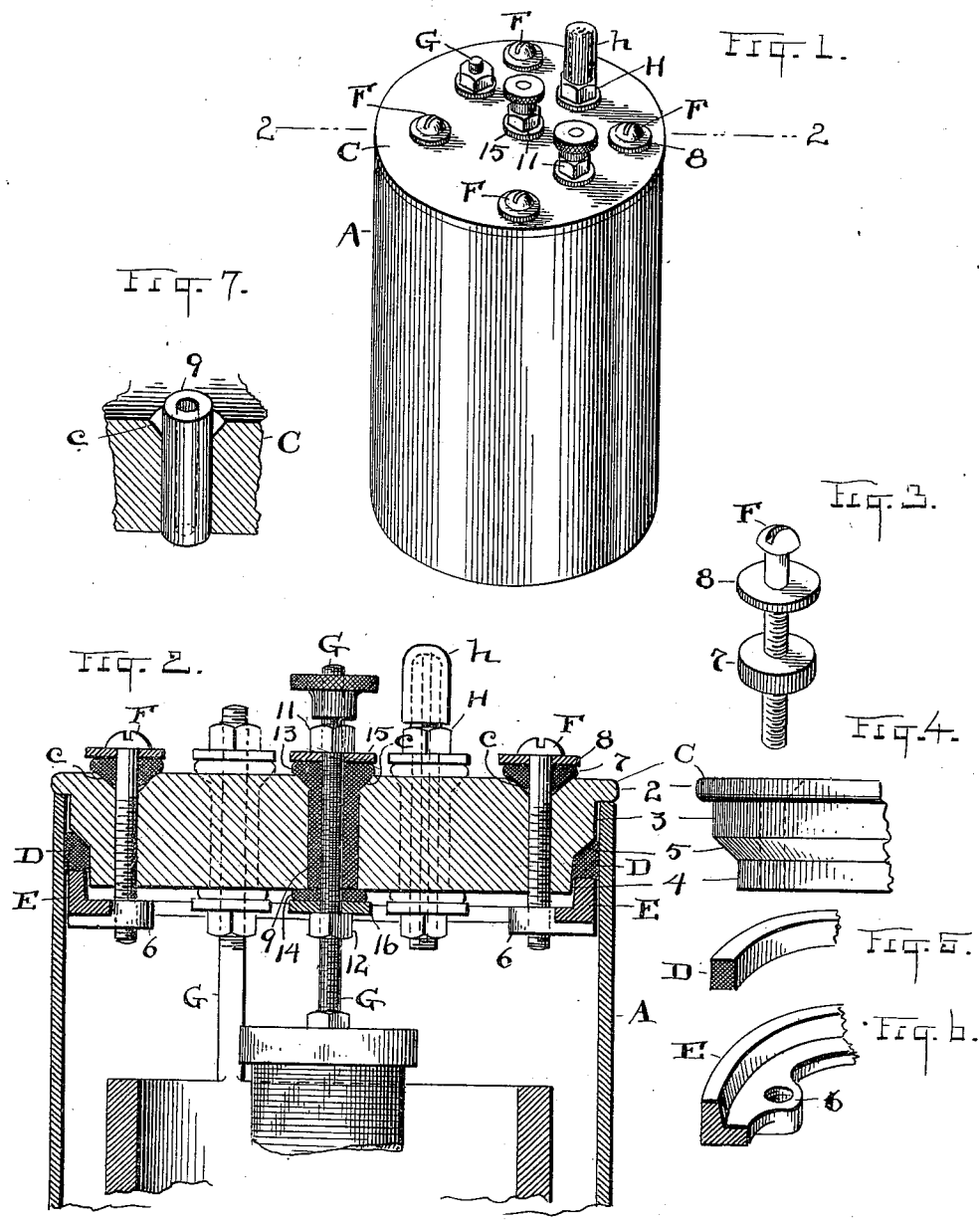
ATTEST
INVENTOR
Philip P. Nungesser
BY W. V. Fisher
ATTY

UNITED STATES PATENT OFFICE.

PHILIP P. NUNGESSER, OF CLEVELAND, OHIO, ASSIGNOR TO THE NUNGESSER ELECTRIC BATTERY COMPANY, OF SAME PLACE.

COVER FOR BATTERY-JARS.

SPECIFICATION forming part of Letters Patent No. 658,860, dated October 2, 1900.

Application filed February 13, 1900. Serial No. 5,068. (No model.)

*To all whom it may concern:*

Be it known that I, PHILIP P. NUNGESSER, a citizen of the United States, residing at Cleveland, in the county of Cuyahoga and State of Ohio, have invented certain new and useful Improvements in Covers for Battery-Jars; and I do declare that the following is a full, clear, and exact description of the invention, which will enable others skilled in the art to which it appertains to make and use the same.

My invention relates to improvements in covers for battery-jars and in the means for securing the cover on the jar and other features, all substantially as shown and described, and particularly pointed out in the claims.

In the accompanying drawings, Figure 1 is a perspective elevation of a jar having a cover constructed with my improvements. Fig. 2 is a vertical sectional elevation on line 2 2, Fig. 1. Fig. 3 is an elevation of one of the cover-tightening bolts and its attachments. Fig. 4 shows an edge elevation of a broken-off part of the cover to disclose the shape thereof. Fig. 5 shows a view of a section or fragment of the packing-ring, and Fig. 6 shows a like fragment of the tightening-ring for the packing. Fig. 7 shows a small sectional elevation of the cover with a soft-rubber bushing therein adapted to receive one of the battery elements, all as hereinafter fully described.

A represents the battery-jar, which, so far as this invention is concerned, may be of any suitable kind of material and of any preferred shape or size and for primary or secondary battery uses. So, also, may the cover C be of any suitable material and adapted to any shape or kind of battery, the use itself not being involved in the invention. In this instance, however, a primary cell is shown.

In portable batteries particularly, as well as in some others, it is desirable to have a perfectly-sealed jar, so that neither liquid nor gas can escape nor air enter the jar. To the end that these results may be secured there have been many and varied means resorted to from time to time, as is now well known in this art and with varied success, but notwithstanding all that has been done in this line I am not aware that any one has ever before known or used a construction which approaches to the present invention in principle or operation. Assuming then that the jar itself is not new and may be variously shaped and used, I employ therewith a novel cover constructed, as here shown, with a slight flange or rim 2, which rests on the edge of the jar. The said cover is otherwise of sufficient depth for the further purposes of my invention, and below its rim or flange 2, in what constitutes its body, has two diameters 3 and 4. The upper and larger diameter practically fills the top of the jar, while the lower diameter is materially smaller, and an inclined shoulder or offset 5 separates the said diameters. This construction of what is properly the edge of the body of the cover really forms an annular recess between the lower portion of the cover and the inside of the jar, with an inwardly and downwardly inclined top portion 5, forming an outwardly-wedging surface for the flexible and elastic packing-ring D, which occupies said recess. A desirable shape of ring D for this recess is shown in Fig. 5, though the normal shape of the ring is not in itself material as long as it answers my purpose, and it is of a size and shape to be placed around the lower portion of the cover, and thus inserted into the jar, but after first having placed in position the clamping-ring E. This ring is shown here as L-shaped in cross-section, with threaded eyes 6 here and there through its lower portion for the clamping-screws F, inserted down through the cover from above. The holes for the said screws are countersunk at their top, and on the screws next to the said countersunk cavities are soft rubber or equivalent washers 7 and next above these are metallic washers 8. Four screws F and their equipments are shown here, but there may be two or more, as may be wanted, and the threaded eyes 6 serve the purposes of nuts in the present construction. A reverse of this might be used with the screw-heads below and nuts at the top or any equivalent arrangement. Now, having these several parts in position relatively, as seen in Fig. 2, but as yet untightened, the packing D will be uncompressed and the cap can be put on and taken off with all the parts united. However, as soon as the screws F are tightened, so as to compress the packing and lock and seal the cover, the packing is forced up against the outward incline 5 into perfect sealing relation therewith and with the wall of the jar, which is opposite, and there is also a close inward-spreading pressure against the wall 4 of the reduced portion of the cover. The effect of this is to not only close the jar against possible leaking about the edge of the cover, but to set up a tendency through the rubber as it lies under compression to pull the cover downward in the jar rather than to crowd it upward. Meantime the tightening of screw F also crowds the rubber washers 7 down into the countersunk cavities c and perfectly seals the screw-passages against escape of fluid or gas in this direction. Therefore, so far as leakage of any kind from within the jar is concerned, the jar is as effectually sealed as if it were all in one piece, and the cover is so firmly held in place that it simply cannot be dislodged without breaking it into pieces. This is in part true, because the rubber packing so engages against the wall of the jar and the reduced edge of the cover as to cause a downward pressure or pull on the cover, as is easily verified by tests when the rubber is only partially tightened.

Another part of the invention lies in the method or manner of securing the elements or electrodes in the cover. Hitherto in batteries of this general character there has been much trouble by reason of the elements, or, rather, the stems G thereof, breaking off just below the cover C. These stems usually are of heavy copper wire, and the agitation to which the battery is subjected in a traveling vehicle very quickly tells on the stem, crystallizing the same just below the cover and causing it to snap off. This is calculated to bring much embarrassment to the user, especially if he be out on the road away from possible repairs. Hence the present invention, wherein I employ a soft-rubber tube or sleeve 9, through which the wire or rod G is inserted through the cover C as shown, and nuts 11 and 12 on said rod bear on soft-rubber washers 13 and 14, and hard washers 15 and 16, respectively, top and bottom of the cover at the ends of sleeve 9. A cavity c is also preferably formed at top of hole for said wire or rod in the cover C, into which there is such compression of the upper extremity of sleeve 9 when the screw 11 is tightened, as well as tightening up of the washers, that there can be no possible leakage in this direction. A perfect seal of the cover C is thus made at all points, and the rods G are so protected at what is otherwise their place of weakness just below the cover that no crystallization at all occurs therein and they serve indefinitely without danger. Suitable soft-rubber thimbles inserted above and below might substitute the present tube 9 and rubber washers 13 and 14, but the construction shown is preferred.

H represents a vent-nipple on the cover, having a rubber vent-cap h or its equivalent to afford a high-pressure outlet for accumulating gases or the like which might endanger the jar by explosion if an escape were not provided.

What I claim is—

1. A jar having an even smooth interior surface about its top, a jar-cover having a relatively-reduced annular lower portion seated therein, packing about said lower portion, a clamping-ring bearing against the bottom of said packing and bolts through the cover threaded into the inner edge of the said clamping-ring to tighten the ring against the packing, in combination with battery elements in the jar and connections therewith through said cover, substantially as described.

2. In electric batteries, a jar-cover having an annularly-reduced lower portion, a packing-ring about said lower portion, a clamping-ring bearing upward against said packing-ring, screws through the cover engaging said clamping-ring and battery elements having their connections through said cover, substantially as described.

3. In battery-jars, a jar-cover, a packing-ring about its bottom portion and a clamping-ring therefor substantially right-angled in cross-section and tightening-screws engaging said ring through the cover, substantially as described.

4. In battery-jars, a jar-cover and a packing-ring about the edge thereof, a clamping-ring substantially L-shaped in cross-section to engage said packing-ring and screws at different places through the cover engaging said rings, substantially as described.

5. In electric batteries, a cover having a series of holes through from top to bottom countersunk at their top, in combination with a clamping-ring below the cover, screws through said holes engaging said ring, and compressible washers about the tops of said screws in countersunk portions of said holes, substantially as described.

Witness my hand to the foregoing specification this 6th day of February, 1900.

PHILIP P. NUNGESSER.

Witnesses:
H. T. FISHER,
R. B. MOSER.